United States Patent [19]

Thastrup

[11] 3,949,461

[45] Apr. 13, 1976

[54] METHODS FOR JOINING INSULATED PIPE LENGTHS

[75] Inventor: Ove Thastrup, Fredericia, Denmark

[73] Assignee: A/S E. Rasmussen, Denmark

[22] Filed: Oct. 26, 1972

[21] Appl. No.: 301,065

[30] Foreign Application Priority Data
Oct. 28, 1971 United Kingdom............... 50231/71

[52] U.S. Cl. .................... 29/460; 285/47; 285/297
[51] Int. Cl.² .......................................... F16L 59/16
[58] Field of Search ........ 285/47, 297; 138/149, 89; 251/217; 29/460, 484

[56] References Cited
UNITED STATES PATENTS

| | | | |
|---|---|---|---|
| 1,349,290 | 8/1920 | Murdock | 138/149 UX |
| 2,474,430 | 6/1949 | Laue | 251/217 |
| 3,177,528 | 4/1965 | Flower et al. | 138/149 X |
| 3,307,590 | 3/1967 | Carlson | 138/149 |
| 3,325,195 | 6/1967 | Margis | 285/294 |
| 3,369,826 | 2/1968 | Boosey et al. | 285/47 |
| 3,453,716 | 7/1969 | Cook | 29/460 X |
| 3,559,660 | 2/1971 | Rollins | 138/149 |
| 3,682,824 | 8/1972 | Creaser | 138/149 X |
| 3,711,124 | 1/1973 | Gerholt et al. | 285/47 |
| 3,731,710 | 5/1973 | Bauer et al. | 138/149 X |

*Primary Examiner*—Ronald J. Shore
*Attorney, Agent, or Firm*—Craig & Antonelli

[57] ABSTRACT

A method of providing insulated joints between consecutive lengths of insulated pipes each consisting of at least one fluid conducting pipe surrounded by a layer of heat insulating material and an outer protective tube from which the ends of the conductor pipe or pipes project, whereby two aligned pipe lengths are joined by joining the protruding conductor pipe ends by welding or otherwise, thereafter mounting a tube casing around the space between the adjacent ends of the insulating material, said casing being sealed against the end portions of the protective tubes, then letting a foam producing substance foam up inside the tube casing until the foam flows out through an upper hole in the tube casing, and thereafter closing this hole by means of a stopper, characterised in that the stopper is mounted in the hole before the foam appears therein, the stopper used being adapted so as to close the hole only partially in the first instance and having means operable to completely close the hole, these closing means being actuated for complete and permanent sealing of the hole after the foam having appeared at the outside of the partly closed hole. Further a tube casing having a hole and a stopper to be mounted in this hole, said stopper being of the expansion type and having a through going channel which is closed by the final tightening of the stopper so as to allow a small amount of foam material to be pressed out through the channel after the stopper being mounted in the hole, but before the final tightening of the stopper.

11 Claims, 5 Drawing Figures

METHODS FOR JOINING INSULATED PIPE LENGTHS

The present invention relates to heat insulated pipe systems such as subterranean district heating pipe systems, and more particularly the invention relates to a method of providing insulated joints between consecutive lengths of insulated pipes each consisting of at least one fluid conducting pipe surrounded by a layer of heat insulating material and an outer productive tube from which the ends of the conductor pipe or pipes project, whereby two aligned pipe lengths are joined by joining the protruding conductor pipe ends of welding or otherwise, thereafter mounting a tube casing around the space between the adjacent ends of the insulating material, said casing being sealed against the end portions of the protective tubes, then letting a foam producing substance foam up inside the tube casing until the foam flows out through an upper hole in the tube casing, and thereafter closing this hole by means of a stopper. It should be ensured hereby that also the joints are heat insulated and protected against intrusion of moisture and corrosion attacks during the following many years in humid surroundings. It is important that the foam fills out the entire casing and the immediate surroundings of the stopper so as to contribute to a tight closing of the hole. Normally, the foam is produced by pouring a foaming liquid mixture through the said hole into the tube casing whereafter there is developed a foam e.g. of polyurethane which hardens after a while.

It has been normal practice to pour the foaming mixture into the tube casing and then wait for the foam to appear in the hole, whereafter a tightly sealing stopper is pressed into the hole. This should be done promptly when the foam has appeared, in order to avoid loss of foam material, and in practice this gives rise to some difficulties, because either a considerable amount of wasted waiting time is involved, or the fitter will be liable to mount the stopper too early or too late. If he will make an estimate of the time which is left before the foam appears in the hole and thereby determine whether he can carry out some work elsewhere in the meantime he will normally put an eye or an ear to the hole whereby he will be exposed to the poisenous gas leaving the hole during the foaming up of the substance. Moreover, tests seem to prove that it is very difficult to provide a stopper which may be pressed into the hole and which seals the hole with sufficient efficiency.

It is the purpose of this invention to provide a method whereby a correct foam filling of the tube casings may be ensured without giving raise to the problems mentioned above.

According to the invention the said stopper is mounted in the hole before the foam appears therein, the stopper used being adapted so as to close the hole only partially in the first instance and having means operable to completely close the hole, these closing means being actuated for complete and permanent sealing of the hole after the foam having appeared at the outside of the partly closed hole. In this manner the effective flow-through area of the hole may be considerably restricted by the insertion of the stopper, so that thereafter, when the casing becomes fully foamed up during exhaust of air and gas through the restricted opening, the foam will leave the hole with a very little amount per time unit, i.e. in practice with a neglectible amount, whereby the fitter need not steadily supervise the single casings under filling. He may mount the stopper immediately after having poured down the foaming mixture through the hole, and thereafter it will be sufficient to inspect the casing or casings from time to time during the further work, if desired with realtively long intervals of time. There will be no need for him to get close to the holes before he can see that the foam has started being pressed out of the restricted holes. Thereafter he can carry out the final closing of the hole.

Inasfar as the stopper should be adapted to close the hole in two steps it will be possible to provide a very tight closure, e.g. with the use of a stopper made of semihard material and having a narrow axial passage which may be closed by means of a slightly conical closing pin; when this pin is pressed into the passage it will serve partly to close the passage and partly to cause a radial expansion of the stopper material whereby the latter is pressed firmly against the edge of the hole.

The invention also comprises a tube casing having a hole and a stopper therefor, the stopper being particularly adapted so as to facilitate the use of the above mentioned method. Further details of this arrangement will appear from the following description, in which reference is made to the accompanying drawing, in which:

FIG. 1 is a sectional view of a joint of the type here referred to,

Figure 1:
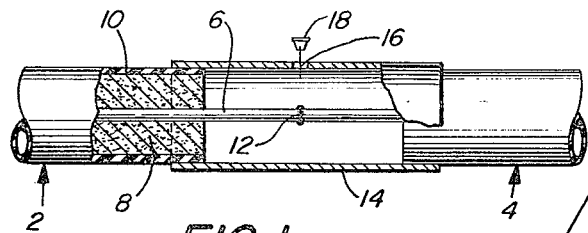

In FIG. 1 there is shown a joint between two prefabricated insulated pipes 2 and 4 each comprising a conductor pipe 6 which is surrounded by a layer 8 of a heat insulating material such as polyurethane foam and outermost by a protective tube 10 of a tight and resistant material such as polyethylene. The free ends of the conductor tubes 6 project from the ends of the insulation 8 and the tubes 10 and these free ends are in situ joined at 12 by welding or any other convenient joining method. At the joint there is thereafter mounted a tube casing 14 which may be a tubular push casing originally placed around one of the adjacent ends of the outer tubes 10 and then pushed over the joint so as to bridge the ends of the tubes 10, or the casing may be made of two half cylindrical steel shells which are tightened together around the ends of the tubes 10. In its top side the tube casing 14 is provided with a hole 16 through which, after the mounting of the casing, there is poured a liquid mixture which thereafter foams up inside the tube casing for filling the same with an insulating foam e.g. of polyurethane.

The joint so far described is well known, and it is also known to close the hole 16 by means of a stopper 18 when the foaming up inside the casing has reached the point at which the foam material leaves the casing through the hole 16. This closing, however, has been connected with the problems described above.

As mentioned, according to the invention there is used a stopper which is inserted in the hole 16 immediately after the pouring in of the foaming mixture and which allows air and gas to escape from the casing during the foaming therein, while on the other hand it prevents excessive outflow of foam material therefrom and is adapted to be finally closable when by an actual, small foam outflow it has been ascertained that the casing is correctly foamed up.

Figure 2:
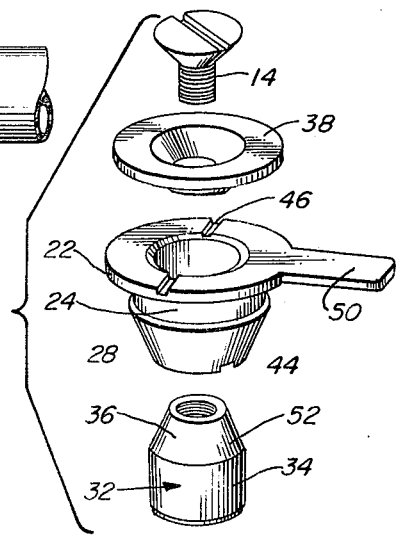
FIG. 2 is a perspective exploded view of a stopper according to a preferred embodiment of the invention.
Figure 3:
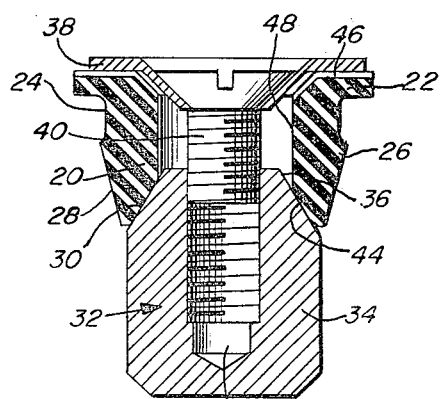
FIGS. 3 and 4 are sectional views of the stopper in non-expanded and expanded positions, respectively.
Figure 4:
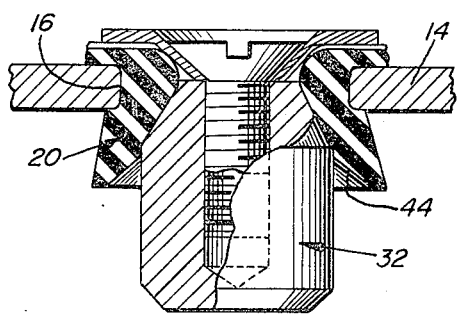

A preferred embodiment of such a stopper is shown in FIGS. 2 to 4. It consists of an annular elastomeric stop per body 20 of a resistive material such as high pressure polyethylene. At its top side the stopper body has a flange portion 22 with which it can be rested against the top side of the casing around the hole 16, and underneath this portion the stopper body has a cylindrical surface portion 24, the diameter of which substantially corresponds to the diameter of the hole 16. Underneath the cylindrical surface 24 the stopper body has an annular, protruding portion 26 the exterior diameter of which is larger than the hole diameter, and underneath this protrusion the exterior surface of the stopper body is downwardly conical as shown at 28. At its interior side the body 20 is at its lower end formed with a conical surface 30 which (in the position shown in FIG. 3) is rested against a correspondingly conical portion 36 of a tightening member 32 made of a rigid material such as brass and having a lower cylindrical portion 34 of a diameter slightly smaller than that of the hole 16. At its top side the stopper body is covered by a rigid disc 38 in which there is provided a countersunk central hole for receiving a tightening bolt 40 extending down into a screw cut hole 42 in the member 32.

In the interior conical portion 30 of the stopper body there is provided a couple of grooves 44 each extending in a radial plane of the body, and in the top side of the flange portion 22 there is provided a couple of radially extending grooves 46, while the interior main surface portion 48 of the body 30 is smooth. The flange 22 is provided with a radially projecting flap 50 in which the stopper may be held during the mounting thereof.

When the foaming mixture has been poured into the tube casing 14 through the hole 16 the stopper structure shown in FIG. 3 is pressed or hammered into the hole in which it is held by means of the barb like annular protrusion 26. Air and gas may escape from the casing through the grooves 44 and 46, and when the foam has filled out the casing a small amount of foam will leak out through the stopper the same way. When from the outside it has been noted that the foam has started leaving the casing the stopper is tightened by turning the screw 40 until the tightening body 32 has been screwed up as high as possible (FIG. 4). Hereby the conical portion of the tightening body 32 will be pressed up into the stopper body which will thereby be expanded and thus be pressed firmly and sealingly against the edge of the hole 16. By the tight engagement between the tightening body and the interior smooth side 48 of the stopper body 30 there will no longer be any passage through the groove 44 into the interior of the stopper body, i.e. a total and permanent closing of the hole 16 is obtained.

For counteracting a rotation of other parts of the stopper by the turning of the screw 40 there may be provided serrations 52 in the conical surface of the tightening body 32, and besides the stopper body 30 may be held in the flap 58 during the turning of the screw.

Figure 5:
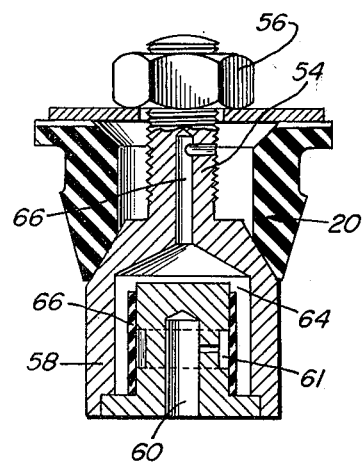
FIG. 5 is a sectional view of a modified embodiment of the stopper.

In FIG. 5 there is shown a modified embodiment in which the tightening body 32 is provided with a screw cut shaft 54 substituting the screw 40 in FIGS. 2 to 4, a nut 56 being used for the tightening of the stopper. Moreover, in the embodiment shown, the tightening body has a lower portion 58 in which there is provided an inlet channel 60 communicating with an annular groove 61 in a cylindrical portion covered by a piece of valve rubber 62. It is hereby made possible for steam under a certain pressure to escape from the tube casing after the final closing thereof, since the steam will be pressed out into a chamber 64 which communicates with the atmosphere through a channel 66. On the other hand, moisture from outside will not be above to obtain access to the interior of the tube casing.

The invention is not limited to the embodiments shown, since e.g. the outlet channel or channels for the foam may be provided adjacent the outer periphery of the stopper body 30 whereby they will be closed by the expansion of this body. The channels need not be groove shaped, since they may be constituted e.g. by the space between the edge of the hole 16 and the longer sides of a slightly elliptic stopper member 30.

It should be mentioned that the tube casing and the stopper according to the invention is not limited to use in connection with joints of aligned pipes. Generally they are usable whereever it is actual to mount a tube casing which should thereafter be filled with insulating foam. The tube casing itself, as well known in the art, may be shaped as a tube tee or a tube bending according to the requirements, and it is usable also in connection with repair work on the tube insulation, i.e. where there is no actual pipe joint inside the casing.

It is an important aspect of the invention that due to the extremely tight seal of the hole 16 obtained by means of the stopper it is possible to carry out a pressure test of the entire tube casing, i.e. to ascertain whether the joints between the tube casing and the protective tubes and between the joining flanges of the casing itself in case of a double shell casing are absolutely tight. This is obtainable by dosing the foam producing mixture so that it will fill the casing with foam and then — after the stopper being finally sealed — produce an overpressure in the casing. With the commercially available foam producing ingredients it is possible to obtain an overpressure of 1–3 atmospheres, and since this pressure will be produced before the foam has set some foam will appear on the outside of the joining areas if there is any possibility of leakage. Thus, if foam is pressed through the jonts at any place by this test the entire work should be redone.

What is claimed is:

1. A method of providing insulated joints between consecutive lengths of insulated pipes, each length consisting of at least one fluid conducting pipe surrounded by a layer of heat insulating material and an outer protective tube from which the respective ends of the at least one fluid conducting pipe project, the method including joining the projecting fluid conducting pipe ends of two aligned and adjacent pipe ends by welding or the like, mounting a tube casing sealed against the end portions of the outer protective tube around the space between adjacent ends of the layer of heat insulating material, introducing a foam producing substance into an upper hole in the tube casing, permitting the foam producing substance to foam up inside the tube casing until the foam flows out through the upper hole in the tube casing, and closing the upper hole in the tube casing by means of a stopper, the improvement comprising: providing a stopper having a selectively actuable closure means having at least an open position and a sealing position, mounting the stopper in the upper hole of the tube casing before the foam appears therein with the closure means in the open position to partially close the upper hole of the tube casing, and actuating said closure means to the sealed position to completely and permanently seal the upper hole of the tube casing after the foam appears at the outside of the partially closed upper hole of the tube casing, the amount of foam producing substance introduced into the tube casing being sufficient to produce, after actuation of said closure means to the sealed position, an over pressure of at least 1 atm. inside the tube casing.

2. A method of providing insulated joints between consecutive lengths of insulated pipes, each length consisting of at least one fluid conducting pipe surrounded by a layer of heat insulating material and an outer protective tube from which the respective ends of at least one fluid conducting pipe project, the method including joining the projecting fluid conducting pipe ends of two aligned and adjacent pipe ends by welding or the like, mounting a tube casing sealed against the end portions of the outer protective tube around the space between adjacent ends of the layer of heat insulating material, introducing a foam producing substance into an upper hole in the tube casing, permitting the foam producing substance to foam up inside the tube casing until the foam flows out through the upper hole in the tube casing, and closing the upper hole in the tube casing by means of a stopper, the improvement comprising:
providing a stopper having a selectively actuable closure means having at least an open position and a sealing position, mounting the stopper in the upper hole of the tube casing before the foam appears therein with the closure means in the open position to partially close the upper hole of the tube casing, and actuating said closure means into the sealed position to completely and permanently seal the upper hole of the tube casing after the foam appears at the outside of the partially closed upper hole of the tube casing, the amount of foam producing substance introduced into the tube casing is sufficient, after actuation of said closure means to the sealed position, to produce a predetermined overpressure inside the tube casing.

3. A method of insulating joints between consecutive lengths of insulated pipes, the pipes having their free ends projecting beyond the insulation and an outer protective casing disposed exteriorly of the insulation, the outer protective casing extending at least substantially along the entire length of the insulation, the outer protective casing and insulation of consecutive pipe lengths being spaced from each other when the free ends of the consecutive pipes are brought into abutting relationhip, the method comprising:
joining the free ends of consecutive pipe lengths;
providing a casing having an opening and a length substantially equal to the space between the outer protective casing and insulation of the consecutive pipes;
supplying a foaming material to the casing through the opening;
partially sealing the opening in the casing immediately after supplying the foaming material;
permitting the foaming material within the casing; and
completely sealing the opening in the casing after the foamed material appears outside the opening at the partial seal;
wherein the step of supplying a foaming material comprises supplying an amount of foaming material into the casing which is sufficient to produce a predetermined overpressure in the casing after completely sealing the opening therein.

4. A method according to claim 3, wherein said overpressure is at least 1 atm.

5. A method according to claim 3, wherein said overpressure is at least 3 atm.

6. A method according to claim 5, wherein the step of joining the free ends of consecutive pipe lengths comprises:
welding the free ends of the consecutive pipe lengths which are brought into abutting relationship.

7. A method according to claim 6, wherein said step of partially sealing the opening comprises:
providing a sealing element having a selectively actuable closure means; and
disposing said sealing element in said opening with said closure means in an open position immediately after supplying the foaming material to the casing.

8. A method according to claim 7, wherein said step of completely sealing the opening comprises:
closing said closure means in the sealing element after the foam appears at the sealing means.

9. A method of insulating joints between consecutive length of insulated pipes, the pipes having their free ends projecting beyond the insulation and an outer protective casing disposed exteriorly of the insulation, the outer protective casing extending at least substantially along the entire length of the insulation, the outer protective casing and insulation of consecutive pipe lengths being spaced from each other when the free ends of the consecutive pipes are brought in abutting relationship, the method comprising:
joining the free ends of consecutive pipe lengths;
providing a casing having an opening and a length substantially equal to the space between the outer protective casing and insulation of consecutive pipes;
supplying a foaming material to the casing through the opening;
partially sealing the opening in the casing immediately after supplying the foaming materials;
permitting the foaming material to foam within the casing;
completely sealing the opening in the casing after the foamed material appears outside the opening at the partial seal;
said step of partially sealing the opening providing a sealing element having a selectively actuable closure means, and disposing said sealing element in said opening with said closure means in an open position immediately after supplying the foaming material into the casing;
said step of completely sealing the opening comprising closing said closure means in the sealing element after the foam appears at the sealing means; and
wherein said step of supplying a foaming material comprises supplying an amount of foam material into the casing which is sufficient to produce a predetermined overpressure in the casing after completely sealing the opening therein.

10. A method according to claim 9, wherein said overpressure is at least 1 atm.

11. A method according to claim 9, wherein said overpressure is at least 3 atm.

* * * * *